United States Patent [19]
Winkler et al.

[11] 3,777,641
[45] Dec. 11, 1973

[54] PHOTOGRAPHIC APPARATUS FOR USE WITH PERCUSSIVELY IGNITABLE FLASH LAMPS

[75] Inventors: Alfred Winkler, Munich; Peter Lermann, Narring; Guenter Fauth, Unterhaching, all of Germany

[73] Assignee: AGFA-Gevaert AG, Leverkusen, Germany

[22] Filed: Apr. 19, 1973

[21] Appl. No.: 352,536

[30] Foreign Application Priority Data
Apr. 28, 1972 Germany.................. P 22 20 874.8

[52] U.S. Cl............... 95/11 L, 95/11.5 R, 240/1.3, 431/92
[51] Int. Cl. ......................................... G03b 15/04
[58] Field of Search............. 95/11 L, 11 P, 11.5 R; 240/1.3; 431/92, 93, 94

[56] References Cited
UNITED STATES PATENTS
3,677,158  7/1972  Ort................................ 95/11.5 R
3,630,129  12/1971  Gow et al...................... 95/11.5 R

*Primary Examiner*—Robert P. Greiner
*Attorney*—Michael S. Striker

[57] ABSTRACT

A still camera wherein a single multiple-purpose programming device is cocked in response to transport of photographic film and is held in the cocked position by the camera release which can be operated to allow the programming device to move to an uncocked position under the action of a strong spring whereby the programming device opens the shutter and causes an impeller to fire a percussively ignitable flash lamp during movement to its uncocked position. When a flash lamp or a holder for several flash lamps is detached from a socket in the camera body, the impeller is withdrawn from the path of movement of the programming device and is replaced by a braking lever which brakes the programming device during movement to uncocked position so that the force with which the programming device strikes against a stop which determines its uncocked position is controlled to avoid excessive camera shake. When the exposures are made with artificial illumination of the subject, the programming device is braked by the impeller.

10 Claims, 2 Drawing Figures

PHOTOGRAPHIC APPARATUS FOR USE WITH PERCUSSIVELY IGNITABLE FLASH LAMPS

BACKGROUND OF THE INVENTION

The present invention relates to improvements in photographic apparatus, especially still cameras, which are provided with means for supporting and firing the percussively ignitable lamps of a mechanically actuable flash unit of the type comprising one or more lamps, an individual preenergized striker or percussion wire for each lamp, and means for separably holding the percussion wire in the energized position.

It is already known to provide a still camera which has a socket for one or more percussively ignitable flash lamps with a single multiple-purpose member (hereinafter called programming device or programming member for short) which can be moved from a first or uncocked position to a second or cocked position and can be released for movement from its cocked position in response to operation of the camera release element. During movement from the cocked position, the programming device normally causes the opening of a shutter and initiates the firing of that flash lamp which faces the subject if a flash lamp or a holder with one or more unfired flash lamps is mounted in or on the camera body. It is also known to provide in such cameras a lamp sensing member which is capable of deactivating the firing mechanism for flash lamps if the lamp or lamps are detached from the camera body.

A drawback of presently known still cameras of the just outlined character is that, when no unfired flash lamp is mounted in or on the camera body, the programming device is accelerated by one or more springs to such an extent that it strikes against a stop with a substantial force which might lead to unsatisfactory exposures due to camera shake. This is due to the fact that the mechanism which fires the flash lamps is automatically retracted from the path of movement of the programming device when no unfired flash lamp is mounted in or on the camera body whereby the firing mechanism cannot subject the rapidly moving programming member to a decelerating action during movement to the uncocked position.

SUMMARY OF THE INVENTION

An object of the invention is to provide a photographic apparatus which can be used with mechanically actuable flash units having percussively ignitable flash lamps with novel and improved means for preventing camera shake when the camera is used to make exposures without artificial illumination of a scene or subject.

Another object of the invention is to provide a still camera with novel and improved means for automatically braking the programming device while the programming device moves toward its uncocked position during the making of exposures without artificial illumination of a subject or scene.

A further object of the invention is to provide a still camera with novel and improved means for changing the position of the mechanism which fires percussively ignitable flash lamps during the making of exposures with artificial illumination.

The improved camera comprises a support (e.g., an indexible socket) for flash lamps (especially for percussively ignitable flash lamps) which is mounted in or on the camera body, a programming device (preferably a single multiple-purpose member) which is movable between cocked and uncocked positions and is biased to its uncocked position by a torsion spring or the like, a shutter and means for opening the shutter in response to movement of the programming device to its uncocked position, release means which normally holds the programming device in cocked position and is operable by the user to allow the programming device to move to its uncocked position under the action of the biasing means, lamp firing means which may include an impeller movable to and from an operative position in which the impeller is ready to initiate the firing of a lamp in response to movement of the programming device to its uncocked position, braking means which may include a lever pivotable to and from an operative position in which the lever is ready to brake the movement of the programming device to its uncocked position, and sensing means which serves to move the impeller to the operative position in response to attachment of a lamp to the support and which can move the braking lever to operative position in response to detachment of a lamp from the support. This insures that the programming device is braked by the impeller during the making of exposures with artificial illumination of a subject or scene and that the programming device is braked by the braking lever during the making of exposures in daylight. Therefore, the programming device cannot strike against a stop (which determines its uncocked position) with a force which is large enough to cause camera shake.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
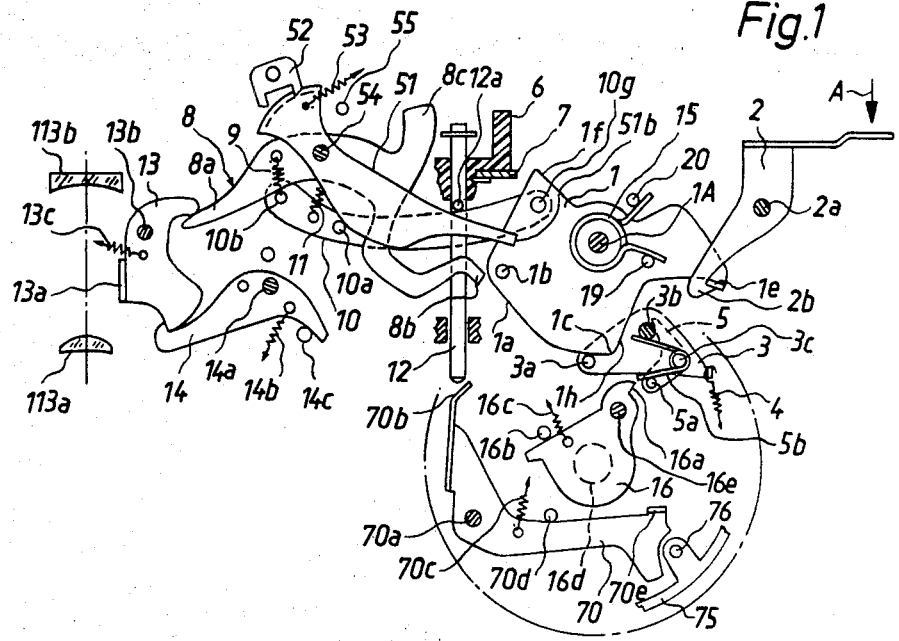
FIG. 1 is a schematic fragmentary vertical sectional view of a still camera which embodies one form of the invention, the mechanism for firing percussion ignitable flash lamps and the braking means being shown in positions they assume when a multiple flash lamp holder is detached from the camera body.
Figure 2:
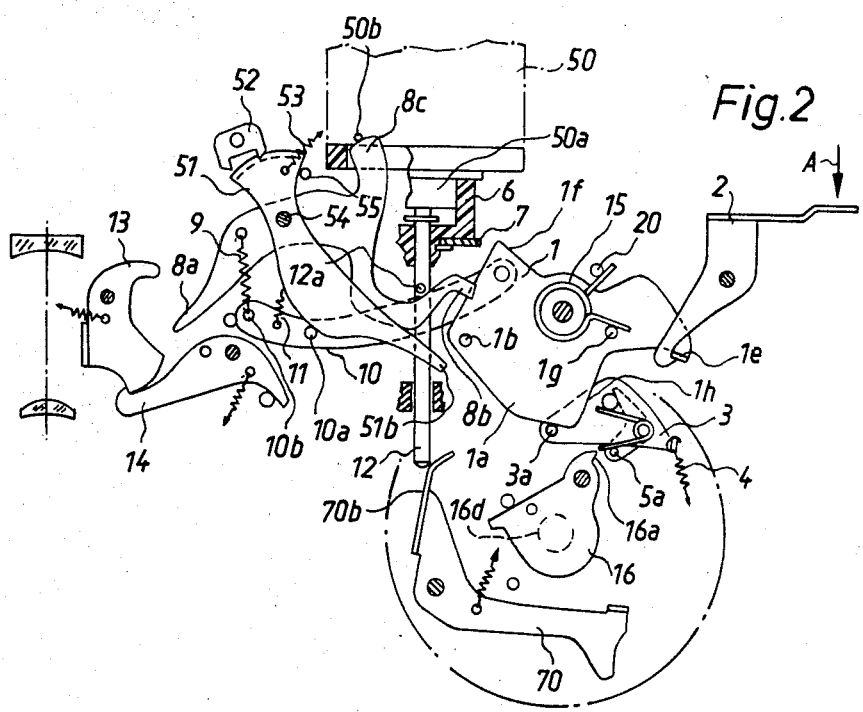
FIG. 2 is a similar sectional view but showing the firing mechanism and the braking means in positions they assume when a multiple flash lamp holder is mounted in a socket of the camera body.

FIG. 1 illustrates a portion of a still camera which comprises a release element 2 mounted on a horizontal shaft 2a and being pivotable by hand in the direction indicated by an arrow A to thereby disengage its hook-shaped inner end portion 2b from a single multiple-purpose programming device 1 which is mounted for angular movement on a horizontal shaft 1A. The programming device 1 is a flat plate having a cam 1a which is tracked by the follower 3a of an impacting or shutter driving member 3. When the programming device 1 assumes the cocked position shown in FIG. 1, its lug 1e engages the hook-shaped portion 2b of the release element 2. The shutter driving member 3 is biased in a clockwise direction, as viewed in FIG. 1, by a helical spring 4 which maintains the follower 3a in engagement with the cam 1a of the programming device 1. The shaft for the driving member 3 is shown at 3b. This driving member carries a pin 3c which is parallel to the shaft 3b and turnably supports a pawl 5 which is biased by a torsion spring 5b and has a pin-shaped projection 5a capable of striking against a shoulder 16a provided on the blade 16 of a simple shutter. The blade 16 is normally biased against a stop 16b by a weak helical spring 16c so that it overlies a light-admitting aperture 16d. The pivot for the blade 16 is shown at 16e. The projection 5a can strike against the shoulder 16a of the shutter blade 16 when the programming device 1 is allowed to turn in a clockwise direction, as viewed in FIG. 1, toward its uncocked position and to such an extent that the lobe 1c of the cam 1a moves beyond the follower 3a so that the latter can rapidly travel along the substantially radially extending portion 1h of the cam 1a. A device for limiting the extent of pivotal movement of the blade 16 from the illustrated closed position comprises a lever 70 which constitutes a stop for a projection 16f of the blade 16. The lever 70 assumes the operative position which is shown in FIG. 1 when the camera body does not support one or more flash lamps and, therefore, is not ready to make exposures with artificial illumination of the subject or scene. The lever 70 is pivotable on a shaft 70a and has a projection 70b which extends into the path of movement of a reciprocable flashcube sensing member 12. A spring 70c tends to maintain the lever 70 in abutment with a stop 70d. When the lever 70 assumes the inoperative position of FIG. 1, the camera is ready to make exposures with relatively short exposure times because the lever 70 maintains its projection 70e in the path of movement of the projection 16f of the shutter blade 16. When a flashcube 50 (see FIG. 2) is attached to the body of camera, the sensing member 12 pivots the lever 70 in a clockwise direction so that the projection 70e is moved out of the path of movement of the projection 16f on the shutter blade 16. This allows the shutter blade 16 to turn through a greater angle in response to each impact transmitted to its shoulder 16a by the projection 5a so that the exposure time is longer than when the camera makes exposures without artificial light.

A bearing plate 7 which can be said to constitute a portion of the camera housing or body supports an indexible socket or support 6 which can be coupled to the base of a flashcube 50. The manner in which the socket 6 is indexible to place successive flash lamps in proper position for illumination of a subject or scene is not shown in the drawing. As a rule, the socket 6 will be indexed in response to actuation of the film transporting mechanism (not shown) which is actuated upon completion of each exposure in order to move the programming device 1 from the uncocked position to the cocked position of FIG. 1 as well as to advance the film (not shown) by the length of a frame.

The programming device 1 can further actuate a lamp firing lever 8 which constitutes an impeller adapted to initiate the firing of a flah lamp at the exact moment when the light-admitting aperture 16d of the camera is unobstructed and can admit scene light against the foremost unexposed film frame. The impeller 8, which has three arms 8a, 8b, 8c and is turnable on a horizontal shaft 54 mounted in the camera body, is coupled to a control lever 10 by a helical spring 9 so that a pin 10b of the control lever normally abuts against the adjacent portion of the arm 8a when the impeller 8 assumes the inoperative position of FIG. 1. A spring 11 biases the control lever 10 in a clockwise direction, as viewed in FIG. 1, so that an intermediate portion of the control lever abuts against a radially outwardly extending pin 12a of the sensing member 12 and maintains the member 12 in the raised position of FIG. 1 because the socket 6 is empty. The pivot for the control lever 10 is shown at 10g. The arm 8a of the impeller 8 can disengage a signalling means 13 (here shown as a pivotable flag) from a locking pawl 14 so that a portion 13a of the flag 13 can be seen in the view finder which includes the optical elements 113a and 113b. The flag 13 is pivotable on a horizontal shaft 13b and is biased clockwise by a helical spring 13c. The locking pawl 14 is pivotable on a shaft 14a and is biased clockwise by a helical spring 14b which normally maintains the right-hand arm of the pawl 14 in abutment with a stationary stop 14c in the camera body.

The reference character 20 denotes a stop which is provided in the camera body to serve as an abutment for the shoulder 1f of the programming device 1 when the latter reaches its uncocked position. The programming device 1 carries a motion transmitting projection 1b which can strike against the arm 8b of the impeller 8 when the latter assumes the operative position shown in FIG. 2. The means for biasing the programming device 1 toward its uncocked position (i.e., against the stop 20) comprises a torsion spring 15 which is convoluted around a hub of the device 1 and one leg of which reacts against the stop 20. The other leg of the spring 15 bears against a post 19 on the programming device 1.

In accordance with a feature of the invention, the camera further comprises a braking device which is operative to brake the programming device 1 during movement toward the stop 1 but only when the socket 6 is not connected with the base 50a of a flashcube 50, i.e., when the sensing member 12 is free to assume the extended position of FIG. 1 and the arm 8a of the impeller 8 abuts against the pin 10b of the control member 10. The braking device comprises an elongated braking member 51 which is a two-armed lever fulcrumed in the camera body, as at 54, and the longer arm 51b of which can extend into the path of movement of the motion transmitting projection 1b on the programming device 1. The shorter arm of the braking member 51 forms part of a conventional escapement having a pivotably mounted anchor 52 cooperating with the teeth of the member 51 and a helical spring 53 which tends to maintain the shorter arm of the braking member 51 in abutment with a stop 55. The longer arm 51b of the braking member 51 abuts against a pin 10a of the control lever 10 and the spring 11 is strong enough to prevent the spring 53 from moving the shorter arm of the braking member 51 against the stop 55 when the socket 6 does not receive the base 50a of a flashcube, i.e., when the sensing member 12 is not in the depressed position of FIG. 2.

The release element 2 is biased to the illustrated position by a suitable spring (not shown) so that its end portion 2b automatically engages the lug 1e of the programming device 1 when the latter returns to the cocked position during actuation of the film transporting mechanism.

It will be noted that the view finder including the optical element 113a, 113b is shown turned through 90° for the sake of convenient illustration; in actuatl practice, the axis of the view finder is parallel to the axis of the picture taking lens (not shown) in front of the light-admitting aperture 16d.

The operation:

If the user wishes to make one or more exposures without artificial illumination, the flashcube 50 is detached from the socket 6 so that the parts 8, 10 and 51 assume the positions shown in FIG. 1. The user actuates the film transporting mechanism so that an unexposed film frame is placed behind the light-admitting aperture 16d and that the programming device 1 moves to the cocked position of FIG. 1 and is held in such position by the release element 2. The shutter blade 16 abuts against the stop 16b under the action of the spring 16c and the spring 70c maintains the lever 70 in the position of FIG. 1 so that the camera is set to take pictures with relatively short exposure times which are best suited for the making of exposures in daylight.

The user then applies finger pressure in the direction indicated by arrow A so as to pivot the release element 2 in a clockwise direction, as viewed in FIG. 1. The end portion 2b becomes disengaged from the lug 1e so that the programming device 1 is free to turn clockwise under the action of the torsion spring 15. The cam 1a travels relative to the follower 3a and the driving member 3 is free to pivot under the action of the spring 4 as soon as the lobe 1c moves beyond the follower 3a because the latter is then free to move along the portion 1h of the cam 1a.

The projection 5a of the pawl 5 strikes against the shoulder 16a and propels the shutter blade 16 counterclockwise so that the blade permits scene light to pass through the aperture 16d and to reach the foremost unexposed film frame. The extent of pivotal movement of the blade 16, and hence the exposure time, is determined by the position of the projection 70e which arrests the projection 16f of the blade 16. The spring 16c thereupon contracts and returns the blade 16 to the closed position to thereby terminate the exposure.

The projection 1b of the programming device 1 bypasses the arm 8b of the impeller 8 and strikes against the arm 51b of the braking member 51 whereby the braking member begins to turn counterclockwise at a speed which is determined by the spring 53 and anchor 52. When the projection 1b moves past the arm 51b, the spring 15 is free to move the programming device 1 all the way to the uncocked position in which the shoulder 1f engages the stop 20.

Prior to making of the next exposure, the user actuates the film transporting mechanism to return the programming device 1 to the cocked position of FIG. 1 whereby the projection 1b pivots the braking member 51 clockwise and returns the driving member 3 to the position of FIG. 1. When the projection 1b moves past the arm 51b, the braking member 51 returns to the position of FIG. 1 and the camera is ready to make the next exposure.

That portion of the cam 1a which is located to the left of the lobe 1c has its radius of curvature on the axis of the shaft 1A so that the angular position of the driving member 3 remains unchanged while the programming device 1 turns clockwise to move its lobe 1c toward and past the follower 3a. The driving member 3 begins to turn under the action of the spring 4 only when the lobe 1c moves past the follower 3a. The spring 5b yields during cocking of the programming device 1 so that the projection 5a can bypass the adjacent portion of the blade 16 without opening the shutter.

An advantage of the braking device is that the arm 51b of the braking member 51 intercepts the programming device 1 during movement toward its uncocked position and thus prevents excessive acceleration of the programming device when the user makes an exposure without artificial illumination. In the absence of the braking device, the acceleration of the programming device 1 during movement to the uncocked position could result in camera shake in response to impact of the shoulder 1f against the stop 20.

The reference character 75 denotes a member which is accessible from without the camera body and can be rotated on a shaft 76 to thereby change the angular position of the lever 70 in order to select one of two or more different exposure times when the camera is to make exposures in daylight. If the adjusting member 75 is turned counterclockwise as viewed in FIG. 1, the lever 70 is pivoted clockwise and moves its projection 70e out of the path of the projection 16f on the shutter blade 16. Thus, the camera is then ready to take pictures with longer exposure times. The likelihood that the camera shake might influence the quality of exposures is especially pronounced when the adjusting member 75 maintains the lever 70 in an angular position corresponding to that of FIG. 2 so that the shutter is set to furnish a relatively long exposure time. It will be noted that, in FIG. 2, the projection 70e is held out of the path of the projection 16f by the sensing member 12 (which engages the portion 70b of the lever 70), i.e., not by the adjusting member 75.

It has been found that the improved braking device can readily decelerate the programming device 1 to such an extent that the camera can make satisfactory exposures even if the adjusting member 75 maintains the projection 70e of the lever 70 away from the path of movement of the projection 16f. The position of the control lever 10 in FIG. 1 is such that its pin 10a automatically maintains the arm 51b of the braking member 51 in the path of movement of the projection 1b (operative position of the braking member) when the sensing member 12 is free to assume its extended position. The members 10 and 12 together constitute a composite sensing means which moves the impeller 8 to the operative position of FIG. 2 in response to attachment of a flashcube 50 to the socket or support 6 and which moves the braking member 51 to the operative position of FIG. 1 in response to detachment of the flashcube from the socket.

If the user decides to make one or more exposures with artificial illumination of the subject or scene, the base 50a of a flashcube 50 is inserted into the socket 6 to depress the sensing member 12 whereby the radial pin 12a pivots the impeller 8 clockwise by way of the control lever 10 (which pivots counterclockwise) and spring 11. The pin 10a then allows the spring 53 to pivot the braking member 51 clockwise so that the arm 51b of the member 51 moves out of the path of movement of the projection 1b. The arm 8b moves into the path of movement of the projection 1b and the arm 8c enters from below an opening of the properly inserted flashcube 50 to engage a percussion wire 50b which is free to initiate the firing of a flash lamp as soon as it is moves away from or over a suitable stop (not shown)

in the interior of the flashcube. The percussion wire 50b can be disengaged from its stop in response to counterclockwise pivoting of the impeller 8 under the action of the pin 1b when the programming device 1 is free to move toward its uncocked position.

When the flashcube 50 is properly attached to the socket 6 and the user has actuated the film transporting mechanism to cock the programming device 1 and to place a fresh (unexposed) film frame into register with the aperture 16d, the camera is ready to make exposures with artificial illumination of the subject or scene. The user pivots the release element 2 clockwise whereby the driving member 3 causes the projection 5a of the pawl 5 to open the shutter at the exact moment when the projection 1b has caused the impeller 8 to disengage the percussion wire 50b from its stop so that the flash lamp which faces the subject is fired while the aperture 16d is unobstructed. The sensing member 12 has pivoted the lever 70 clockwise so that the shutter is ready to furnish a relatively long exposure time.

When the impeller 8 is pivoted by the projection 1b, its arm 8a disengages the flag 13 from the locking pawl 14 so that the portion 13a of the flag enters the space between the optical elements 113a, 113b of the view finder to indicate that the socket 6 must be indexed prior to making of the next exposure because the lamp which faces the subject has been fired. The indexing of the socket 6 and flashcube 50 preferably takes place in response to actuation of the film transporting mechanism. This results in a return movement of the programming device 1 to its cocked position and in reengagement of the flag 13 by the locking pawl 14. The camera is then ready to make a further exposure with artificial illumination.

The arm 8b of the impeller 8 replaces the arm 51b of the braking member 51 when the camera makes an exposure with artificial illumination. By pivoting the impeller 8, the projector 1b must overcome the bias of the springs 13c, 9 and 11 as well as the resistance of the percussion wire 9 to movement from the position shown in FIG. 2 whereby the programming device 1 is braked on its way toward the uncocked position so that the force of impact of the shoulder 1f against the stop 20 is relatively small and cannot result in such camera shake which could affect the quality of exposures with artificial illumination. Such exposures are relatively long because the sensing member 12 maintains the lever 70 in the angular position of FIG. 2 in which the projection 70e cannot arrest the projection 16f of the shutter blade 16.

The improved photographic apparatus is susceptible of many modifications. For example, the illustrated braking device can be replaced by any other braking or retarding means, such as a mass or weight having a high inertia and being movable by the projection 1b or another part of the programming device 1 against the opposition of a restoring spring while the device 1 moves toward its uncocked position when the socket 6 is empty. Also, the impeller 8 and the braking member 51 need not be turnable about a common axis and their shapes (as well as the shapes of other parts shown in FIGS. 1 and 2) can deviate from the illustrated shapes. Still further, the programming device 1 can be mounted in a different position relative to the shutter, release element and/or other parts of the camera, and this programming device can perform one or more additional functions (for example, to directly or indirectly prevent repeated exposure of film frames). Finally, the invention can be embodied in photographic apparatus which are not provided with indexible sockets for multiple flash lamp holders, i.e., the body of the camera can be provided with support means for receiving a single flash lamp at a time, especially a percussively ignitable flash lamp.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended

1. In a photographic apparatus, a combination comprising a support for flash lamps, particularly for percussively ignitable flash lamps; a programming device movable between cocked and uncocked positions; biasing means for urging said device to said uncocked position; a shutter; means for opening said shutter in response to movement of said device to said uncocked position; release means having means for holding said device in said cocked position and being operable to release said device for movement to said uncocked position under the action of said biasing means; lamp firing means movable to and from an operative position in which said firing means is ready to initiate the firing of a lamp in response to movement of said device to said uncocked position; braking means movable to and from an operative position in which said braking means is ready to brake the movement of said device to said uncocked position; and sensing means for effecting the movement of said lamp firing means to said operative position in response to attachment of a lamp to said support and for effecting the movement of said braking means to said operative position in response to detachment of a lamp from said support.

2. A combination as defined in claim 1, wherein said lamp firing means comprises a portion which extends into the path of movement of said programming device from said cocked to said uncocked position in the operative position of said lamp firing means, said braking means comprising a portion which extends into the path of movement of said programming device from said cocked to said uncocked position in the operative position of said braking means.

3. A combination as defined in claim 2, wherein said portions of said lamp firing means and said braking means are pivotable into and from the path of movement of said programming device.

4. A combination as defined in claim 1, wherein said sensing means comprises a sensing member which is movable between first and second positions which said sensing member respectively assumes when a lamp is respectively attached to and detached from said support, and a control member which is pivotable by said sensing member to move said lamp firing means to said operative position in response to movement of said sensing member to said first position and to move said braking means to said operative position in response to movement of said sensing member to said second position.

5. A combination as defined in claim 4, further comprising resilient means for coupling said control member to said lamp firing means and said braking means.

6. A combination as defined in claim 5, wherein said control member is a lever and said lamp firing means comprises an impeller which is pivotable to and from said operative position thereof, said braking means comprising a further lever which is pivotable to and from said operative position thereof.

7. A combination as defined in claim 6, wherein said control member has first and second projections and said resilient means comprises a first spring arranged to bias said impeller against one of said projections and a second spring arranged to bias said lever of said braking means against the other of said projections.

8. A combination as defined in claim 1, wherein said lamp firing means comprises a spring-biased impeller which yieldably resists the movement with said programming device to thereby brake said device during movement to said uncocked position when said release means is operated while said firing means assumes said operative position thereof.

9. A combination as defined in claim 1, wherein said programming device is rotatable between said cocked and uncocked positions about a fixed axis.

10. A combination as defined in claim 1, wherein said sensing means comprises control means for automatically moving said lamp firing means from said operative position in response to movement of said braking means to said operative position, and vice versa.

* * * * *